Oct. 31, 1950  H. A. KELLY  2,528,229
FISH GAFF
Filed July 31, 1947
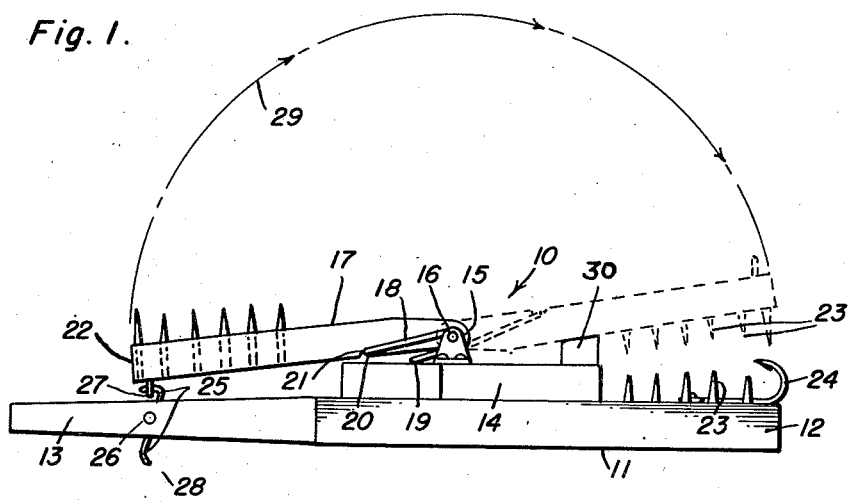
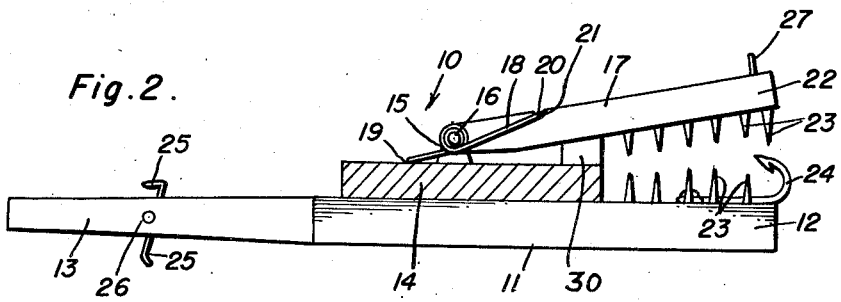
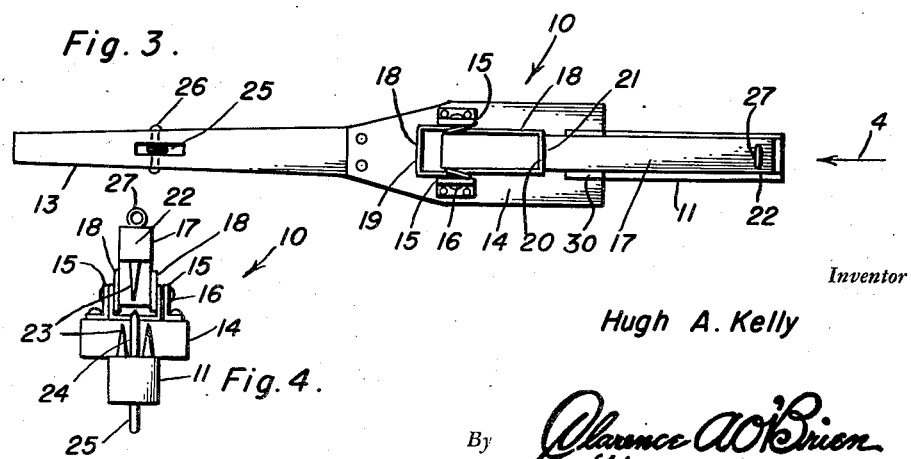
Inventor
Hugh A. Kelly
By Clarence A. O'Brien
and Harvey B. Jacobson
Attorneys Patented Oct. 31, 1950

2,528,229

UNITED STATES PATENT OFFICE 2,528,229

FISH GAFF

Hugh A. Kelly, Faust, N. Y.

Application July 31, 1947, Serial No. 765,172

1 Claim. (Cl. 294—104)

This invention relates to new and useful improvements and structural refinements in fish gaffs, and the principal object of the invention is to provide a device of the character herein described, such as may be conveniently and effectively employed for firmly and securely holding fish while the same are being removed from the fishing line.

A further object of the invention is to provide a fish gaff which is particularly adapted to prevent the fish from escaping and which may be easily and conveniently manipulated.

Another object of the invention is to provide a fish gaff which is simple in construction, which will not easily become damaged, and which will readily lend itself to economical manufacture.

An additional object of the invention is to provide a fish gaff which is otherwise well adapted for the purpose for which it is intended.

With the above more important objects in view, and such other objects as may become apparent as this specification proceeds, the invention consists essentially of the arrangement and construction of parts and portions as illustrated in the accompanying drawings, in which:

Figure 1 is a side elevation of the invention, showing the same in the open position;

Figure 2 is a further side elevational view, substantially the same as that shown in Figure 1, but illustrating the gaff in the closed position;

Figure 3 is a top plan view of the subject shown in Figure 2, and

Figure 4 is an end view, taken in the direction of the arrow 4 in Figure 3.

Like characters of reference are used to designate like parts in the specification and throughout the several views.

Referring now to the accompanying drawings in detail, the invention consists of a fish gaff designated generally by the reference character 10, the same embodying in its construction an elongated base member 11 forming a jaw 12 at one end thereof, while the remaining end portion of the member 11 constitutes what may be referred to as a handle 13.

A suitable spacer block 14 is rigidly secured intermediate the ends of the base member 11, and a pair of angle brackets 15 are mounted on the block 14, these providing bearings for a transversely extending shaft or pin 16, whereby a swingable member 17 is pivotally connected to the spacer 14 and to the base member 11, as will be readily understood.

A resilient element, namely, a spring 18 is wound around the pin 16 in such manner that one end portion 19 of the spring bears against the spacer 14, while its remaining end portion 20 engages a notch 21 formed in the member 17. By virtue of this arrangement, the jaw 12 and the coacting jaw 22 (provided by the member 17) are normally urged together, as is illustrated in Figure 2.

The opposing surfaces of the two jaws are equipped with a plurality of gripping elements or pointed prongs 23, and, if desired, a fish hook 24 may also be secured to the jaw 12, as will be clearly apparent.

Means are also provided for releasably retaining the swingable jaw member 17 in the open position illustrated in the accompanying Figure 1, said means consisting of a trigger hook 25 which is pivoted as at 26 to the handle 13. The hook 25 is releasably engageable with an eye 27 secured to the jaw member 17, whereby the jaw member is effectively retained in an open position, as will be readily understood.

When the invention is placed in use, the fish on the line is simply placed upon the prongs 23 of the jaw 12, and by pressing the trigger 25 in the direction of the arrow 28, the jaw member 17 will be released and will be permitted to swing in the direction of the arrow 29 so that the two jaws 12, 22 firmly and securely grip the fish while the hook (not shown) of the fishing line is being removed from the fish's mouth.

Needless to say, the jaw member 17 is swung in the direction of the arrow 29 by the resiliency of the spring 18, and the pointed prongs 23 effectively assist in increasing the gripping action of the two jaws.

It is to be noted that an additional spacer block 30 is provided on the block 14 and is engageable by the jaw 22 when the latter is swung toward the jaw 12, whereby the jaws are supported in predetermined spaced relation to prevent a fish between the jaws from being damaged by excessive pressure.

It is believed that the advantages and use of the invention will be clearly apparent from the foregoing disclosure and accordingly, further description thereof at this point is deemed unnecessary.

While in the foregoing there has been shown and described the preferred embodiment of this invention it is to be understood that minor changes in the details of construction, combination and arrangement of parts may be resorted to without departing from the spirit of the invention as claimed.

Having described the invention, what is claimed as new is:

In a fish gaff, the combination of an elongated base plate having a raised intermediate portion, one end portion of said base plate providing a handle and the remaining end portion thereof constituting a stationary jaw, a pair of transversely spaced brackets provided on the intermediate portion of said base plate, a fulcrum pin mounted in said brackets, a movable jaw having one end portion thereof pivoted on said pin whereby it may be swung from an open position adjacent said handle to a closed position adjacent said stationary jaw, coacting sets of pointed prongs provided on opposing surfaces of said jaws, means for releasably retaining the movable jaw in an open position, a spacer provided on the intermediate portion of said base plate for engaging the movable jaw and supporting the same in a predetermined spaced relation to the stationary jaw when the movable jaw is closed, and resilient means for swinging said movable jaw in engagement with said spacer, said last mentioned means comprising a substantially rectangular wire spring including a pair of U-shaped sections having side portions thereof connected by a pair of spaced coils, said coils being mounted on said pin at the opposite sides of said stationary jaw whereby one of the U-shaped sections straddles the movable jaw and has its bight portion in engagement therewith, the remaining U-shaped section of said spring extending downwardly from said pin toward said handle and having its bight portion in engagement with the intermediate portion of said base plate.

HUGH A. KELLY.

REFERENCES CITED

The following references are of record in the file of this patent:

UNITED STATES PATENTS

| Number | Name | Date |
|---|---|---|
| 191,165 | Miller | May 22, 1877 |
| 778,552 | Rud | Dec. 27, 1904 |

FOREIGN PATENTS

| Number | Country | Date |
|---|---|---|
| 44,258 | Sweden | July 10, 1918 |